Figure 1:
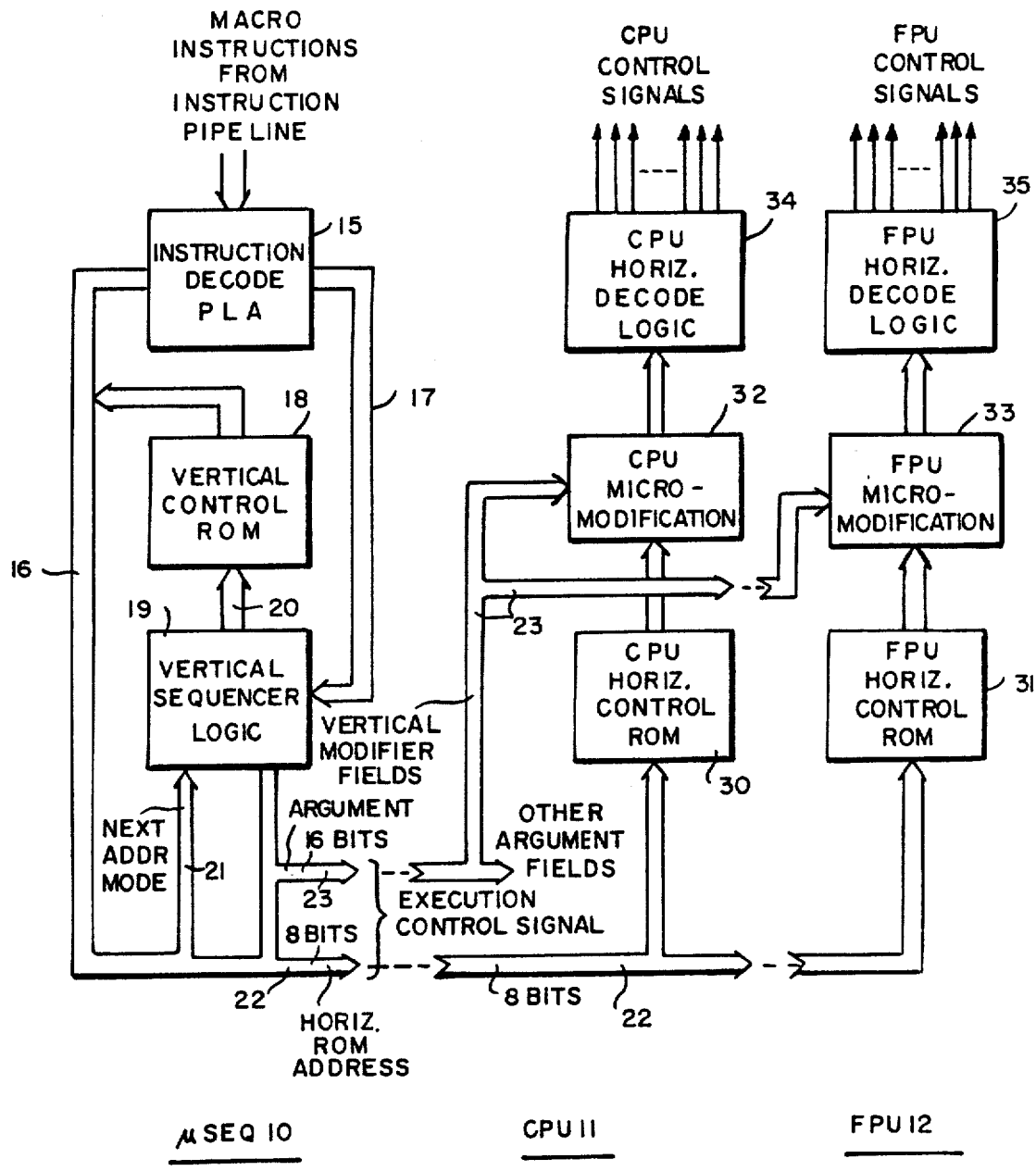

United States Patent [19]

Vora et al.

[11] Patent Number: 4,901,235
[45] Date of Patent: Feb. 13, 1990

[54] DATA PROCESSING SYSTEM HAVING UNIQUE MULTILEVEL MICROCODE ARCHITECTURE

[75] Inventors: Chandra R. Vora, Northboro; Donald C. Wiser, Framingham; Mark B. Hecker, Northboro, all of Mass.; Robert N. Murdoch, Sacramento, Calif.

[73] Assignee: Data General Corporation, Westboro, Mass.

[21] Appl. No.: 546,572

[22] Filed: Oct. 28, 1983

[51] Int. Cl.⁴ .......................... G06F 7/48; G06F 9/22; G06F 12/04
[52] U.S. Cl. .................................... 364/200; 364/748
[58] Field of Search ... 364/704, 748, 736, 200 MS File, 364/900 MS File

[56] References Cited

U.S. PATENT DOCUMENTS

| | | | |
|---|---|---|---|
| 4,371,925 | 2/1983 | Carberry et al. | 364/200 |
| 4,476,523 | 10/1984 | Beanchamp | 364/748 |
| 4,476,537 | 10/1984 | Blau et al. | 364/748 |

OTHER PUBLICATIONS

Computer Design, Mar. 1981, pp. 178–182, "Floating Point Microprocessor Implemented as Optical Co-Processor".
Computer Design, Oct. 1979, pp. 182–186, "Floating Point Chip Performs 32- and 64-Bit Operations".

Primary Examiner—Gary V. Harkcom
Assistant Examiner—Christopher H. Lynt
Attorney, Agent, or Firm—Robert F. O'Connell

[57] ABSTRACT

A data processing system which includes a central processor unit which has an arithmetic logic unit (ALU) for performing fixed point arithmetic operations and a separate floating point unit (FPU) for performing floating point operations and which uses multi-level microcode architecture wherein each unit has its own control store (a "horizontal" store) which responds to addresses of execution control signals supplied thereto from a common control store (a "vertical" store) to produce horizontal microinstructions for performing ALU and FPU operations, respectively. Selected ones of such addresses are recognized for ALU operations by the CPU control store only, other selected ones are recognized for FPU operations by the FPU control store only, while still other selected ones are recognized for both ALU and FPU operations by both control stores so that such operations can be performed simultaneously in parallel.

11 Claims, 2 Drawing Sheets

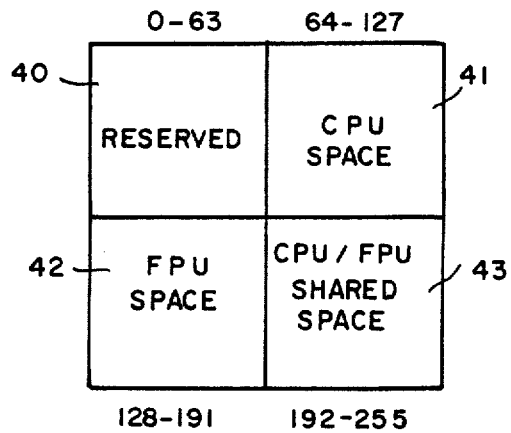
FIG. 2
FIG. 3
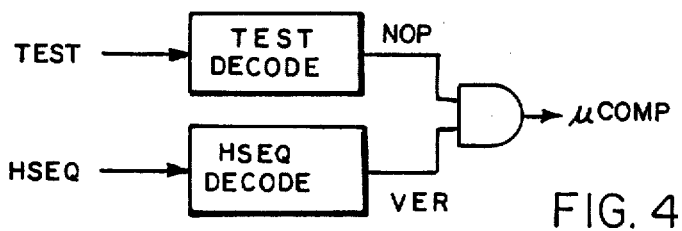
FIG. 4

DATA PROCESSING SYSTEM HAVING UNIQUE MULTILEVEL MICROCODE ARCHITECTURE

This invention relates to data processing systems using micro-processors and, more particularly, to systems using two-level microcode architecture.

BACKGROUND OF THE INVENTION

Data processing systems have generally been developed which utilize microcode architecture in which macroinstructions are suitably decoded so as to provide access to a microinstruction or to a sequence of microinstructions obtained from a suitable data store thereof. In order to reduce the data storage space required for the microinstructions and to avoid handling a large number of "wide" instruction words, certain microcode systems have utilized "two-level" microcode storage techniques. Such two-level configurations are based on the recognition that control information in the microinstruction words are often common to a large number of microinstructions. Therefore in order to avoid the repetitive storage of the same relatively large number of data bits required to store all of the control and sequencing information for each microinstruction separately, certain control information, which is common to many microinstructions, is stored in one store, e.g., a read-only-memory (ROM), separately from other control sequencing information which is stored in a different ROM store. At the first level of operation the control and sequencing process is performed with reference to a first microcode control store ROM (a "first" or "vertical" microcode level) to produce sequencing information as well as control information for use at a second level of operation, with reference to a second control microcode store ROM (a "second" or "horizontal" level) so as to provide a "horizontal" microinstruction which is decoded to generate the control signals required to perform the particular microcode operation involved, the control information in the horizontal microinstruction in many cases being common to many microinstructions.

A system utilizing such two-level microcode architecture is described in U.S. Pat. No. 4,371,925, issued on Feb. 1, 1983 to R. A. Carberry et al. Such a system is described as using a central processor unit having a horizontal control store ROM which stores control information common to many microinstructions and a separate vertical store ROM, together with sequencer control circuitry, which stores sequencing and execution control information. Each horizontal microinstruction represents a basic function to be performed, although one or more fields thereof may be subject to modification by one or more modifier fields supplied by the vertical store ROM, as part of the execution control information as described therein.

In such system only a single horizontal microinstruction control ROM and a single vertical microinstruction control ROM are required, the modified or unmodified horizontal microinstructions then being appropriately decoded by suitable horizontal decode logic to produce the required control signals for use by various units, e.g. an arithmetic logic unit (ALU), within the central processor unit for performing the desired operations represented by the particular microinstruction which is decoded.

In some systems it is desirable to utilize not only an arithmetic logic unit (ALU) for executing fixed point arithmetic operations but also to include in the overall system a separate arithmetic unit for executing floating point arithmetic operations (FPU unit). Normally each execution unit (ALU or FPU) requires its own microinstructions for performing whatever operations are executed thereby and, accordingly, when using a two-level microcode architecture, separate vertical and horizontal control ROMs are utilized for each of the arithmetic units. In order to improve the efficiency thereof a single microsequencer unit can be utilized to provide vertical information, e.g., horizontal control store ROM addresses for each of the ALU and FPU horizontal control store ROMs. Normally the microsequencer must supply the desired horizontal modifiers and addresses to the ALU and FPU units in sequence (i.e., non-simultaneously) so that each of the ALU or FPU operations can be performed separately in an appropriately designated sequence.

It is desirable, however, that both the ALU and FPU units be capable of operating simultaneously so that fixed point arithmetic operations and floating point arithmetic operations can be carried on in parallel, i.e., simultaneously.

SUMMARY OF THE INVENTION

In accordance with the invention a two-level microcode architecture system is organized so that both fixed point ALU operations and floating point FPU operations can be executed in parallel, such units effectively responding to the same vertical execution control information to produce their desired horizontal microinstructions which are then applicable to each unit separately. For such purpose the overall horizontal microinstruction address space is partitioned among each of the execution units, i.e., the horizontal control ROM in the CPU (used for ALU operation) recognizes selected ones of the horizontal addresses for use only by the ALU in the CPU and the horizontal control ROM of the FPU (used for FPU operation) recognizes other selected horizontal addresses for use only by the FPU. Still other selected horizontal addresses are recognized by the horizontal control ROMs of both execution units, thereby permitting concurrent use thereof for operations of the two execution units. In a particular embodiment, certain other addresses may not be used by the system but can be held in reserve for future expansion of the overall microcode architecture.

DESCRIPTION OF THE INVENTION

The invention can be described in more detail with the help of the accompanying drawings wherein FIG. 1 shows a block diagram depicting selected components of certain units of an overall data processing system for use in accordance with the invention;

FIG. 2 shows a diagrammatic representation of an exemplary horizontal address space for the ALU and FPU units of the system of FIG. 1;

FIG. 3 hows representations of exemplary formats of horizontal microinstructions of CPU and FPU units which illustrate exemplary operations of the system of FIG. 1 in accordance with the invention; and FIG. 4 shows an exemplary circuit for producing a control signal used in the operation of the CPU and FPU units of FIG. 1.

As can be seen in FIG. 1, a microsequencer unit 10, receives macroinstructions from a suitable instruction pipeline, which instructions are decoded by an appropriate instruction decode program logic array (PLA)

unit 15 to provide an initial vertical microinstruction from instruction decode PLA 15 on internal bus 16. Decode PLA 15 also supplies an internal bus 17 with the address of the next vertical microinstruction which is to be fetched from a vertical ROM 18. The sequencing of vertical ROM 18 is appropriately controlled by a sequence control signal supplied from vertical sequencer logic 19 via internal bus 20 to vertical control ROM 18. Once the decode PLA 15 supplies the initial microinstruction and the address of the next microinstruction, the sequencing of subsequent vertical microinstructions from ROM 18 to internal bus 16 is determined by sequencing bits supplied to the vertical sequence logic 19 via internal bus 21. Each vertical microinstruction from vertical ROM 18 comprises in a particular embodiment, for example, a 24-bit execution control signal which includes eight bits representing a horizontal ROM address and a 16-bit argument. The execution control output of each vertical microinstruction can be supplied via suitable interconnecting micro-control buses (22 and 23) to both the CPU 11 and the FPU 12.

The operation of the components of the microsequencer unit 10 shown in FIG. 1 can be readily understood from the more detailed description of vertical sequencing provided in the aforesaid Carberry et al. U.S. patent and need not be described in further detail here. The horizontal ROM address is supplied simultaneously to a CPU horizontal control ROM 30 and to an FPU horizontal control ROM 31 located in the CPU unit 11 and the FPU unit 12, respectively, of a data processing system. As described in the aforesaid Carberry et al. patent, selected modifier fields of the argument supplied to such units may be utilized to modify horizontal microinstructions obtained from horizontal control ROMs 30 and 31 by means of appropriate micro-modification units shown as CPU micro-modification unit 32 and FPU micro-modification unit 33. The control ROMs 30 and 31 respond to the horizontal ROM address supplied from the vertical microinstruction of microsequencer 10 to select a horizontal microinstruction for supply to the horizontal decode logic units 34 and 35, respectively, via the micro-modification units mentioned above. The horizontal decode logic units thereupon decode such microinstructions to provide appropriate control signals, in one case, for example, for the central processor unit's fixed point operations and in the other case for the floating point unit's floating point operations.

Selected ones of the addresses supplied to control ROMs 30 and 31 are recognized by the ROMs as requiring the supplying of horizontal microinstructions from only horizontal control ROM 30, while other selected addresses are recognized as requiring the supplying of horizontal microinstructions from only horizontal control ROM 31. Still other selected addresses are recognized by both the control ROM 30 and the control ROM 31 as requiring the simultaneous supplying of different horizontal microinstructions from each ROM in parallel, i.e., simultaneously, for subsequent decoding by their respected decoding units 34 and 35. In a particular embodiment, certain other addresses are not recognized by either control ROM 30 or control ROM 31 as requiring the supplying of any microinstructions for use by either unit, such addresses being held in reserve for future use.

Such operation can be better understood with the help of FIG. 2 in which the horizontal address space is represented as partitioned into four portions. In the particular embodiment being discussed, a horizontal address, as mentioned above, is formed from 8 bits of the execution control output of the vertical microinstruction so that each address represents one of 256 locations.

A first portion of such locations (e.g., locations 0–63) are shown as being unused by either horizontal control ROMs 30 or 31, represented by the "reserved" portion 40 of FIG. 2. Certain horizontal addresses are recognized only by the central processor unit control ROM 30 (e.g., address locations 64–127), represented by the "CPU Space" portion 41 of FIG. 2. Certain other addresses are recognized only by the FPU horizontal control ROM 31 (e.g., locations 128–191), represented by the "FPU Space" portion 42 of FIG. 2. Still other addresses are recognized by both horizontal control ROM 30 and horizontal control ROM 31 (e.g., locations 192–255), represented by the "CPU/FPU Shared Space" portion 43 of FIG. 2.

Accordingly, an overall address space is appropriately shared by the horizontal control ROMs of both the CPU and FPU units so that even with respect to those addresses recognized by both units (i.e., addresses simultaneously accessing horizontal microinstructions for both ALU and FPU operations) each unit can then supply its own particular microinstruction for use by its own decode logic. Examples of different horizontal address access situations are discussed below.

With respect to an address recognized only by the FPU horizontal control ROM 31, the horizontal microinstruction which is supplied from horizontal control ROM 31 in response to an address in address space portion 42 includes a plurality of operational fields which are suitably decoded by FPU decode unit 35 to provide appropriate control signals for execution of a floating point operation as for any conventional two-level microcode operation. In such case the CPU horizontal control ROM 30 also responds to the same address but places the CPU in a NOP (non-operating) mode which indicates that the ALU of the CPU is not to be used for any fixed point operation. An exemplary microinstruction format for the CPU horizontal microinstruction is shown in FIG. 3 for Case #1. Since it is the FPU horizontal microinstruction which controls the execution of the desired FPU operation in response to the particular horizontal address supplied, no other horizontal address can be supplied until the FPU unit has completed the particular operation being executed. When the FPU unit completes its operation, it supplies to the microsequencer unit a special control signal identified as a "microcomplete" ($\mu$COMP) signal. The fact that the FPU has control over the overall sequencing operation and not the CPU is indicated in a particular embodiment by particular selected bit combinations in the TEST and HSEQ fields of the horizontal microinstruction which is supplied by the CPU control ROM 30 as indicated at FIG. 3. Such fields include a bit combination representing a "no-operation" (NOP) condition and a bit combination representing a VER condition, respectively, thereby preventing the CPU unit from supplying a $\mu$COMP signal to the sequencer unit. Thus so long as the TEST field of a microinstruction in a particular unit contains a bit combination representing a NOP condition, together with a VER condition in the HSEQ field, such unit does not control the supplying of a $\mu$COMP signal. If the TEST field contains a bit combination representing anything other than a NOP condition and the HSEQ contains the normal VER mode, such unit controls the supplying of a μCOMP signal. Thus, the TEST field of the horizontal microinstruction supplied by the FPU control ROM 31 (not shown) in Case #1 include a bit combination other than a NOP condition, thereby indicating that the FPU is to supply a μCOMP signal at completion of its operation.

In a similar manner when the CPU recognizes the horizontal address supplied by the vertical microinstruction as requiring a fixed point operation (but not an FPU operation) by its ALU unit (Case #2) the CPU's horizontal ROM 30 supplies a horizontal microinstruction containing fields for suitable decoding in a conventional manner by decode logic 34 to provide for the execution of such microinstruction. In this case an exemplary format for a CPU horizontal microinstruction is shown in FIG. 2. As can be seen, when the CPU operation is completed the HSEQ is in a VER mode (indicating normally that its operation is completed) and the TEST field thereof has a bit combination representing a "HOLD" condition. Since the TEST field is not in a NOP mode, it is interpreted by the decode unit as requiring the supplying of a μCOMP signal by the CPU. In this case the horizontal microinstruction format (not shown) of the FPU microinstruction which responds to the same address will include a "NOP" bit combination in its TEST field indicating that the FPU unit does not control the sequencing of the next horizontal address (since it is not performing any operations) and does not supply a μCOMP signal for such purpose.

In the third case (Case #3) in which the horizontal address is recognized by both control ROMs 30 and 31, each of the control ROMs will in response thereto supply its own horizontal microinstruction for decoding by its associated decode unit. However, only one unit will control the sequencing of the next microinstruction, i.e., that unit which takes the longest time to complete its operation. Normally when a unit has completed its operation its HSEQ field has a VER bit combination and a test is made to see whether the other unit has already completed its operation. If, for example, the FPU has not completed its operation but the CPU has, the TEST field of the CPU will be in a NOP mode which prevents the CPU from supplying its μCOMP signal. If, on the other hand, the CPU has not completed its operation but the FPU has, the TEST field of the FPU will be in a NOP mode which prevents the FPU from supplying its μCOMP signal. Accordingly, only one unit will have a "NOP" bit combination in its TEST field, the other unit having some other bit combination in its TEST field.

An exemplary pair of microinstructions one from each control ROM unit is shown for Case #3 and, as can be seen therein, the CPU horizontal microinstruction provides the required field information for its operation, which in the case shown will take a longer period of time for execution than that for the FPU unit. Accordingly, the CPU horizontal microinstruction has a bit combination other than a NOP condition in its TEST field while the FPU unit has a NOP bit condition in its TEST field. When the CPU unit supplies its μCOMP signal to the sequencer unit (indicating that the CPU has completed its operation), the latter unit is then controlled by the receipt of the CPU's μCOMP signal to supply the next vertical microinstruction containing the next horizontal address.

Exemplary logic of the type which can be used in each execution unit for operating the μCOMP signal is shown in FIG. 4.

Because the horizontal microinstruction address space is partitioned as shown in FIG. 2, it is possible to utilize a single microsequencer unit and at the same time to permit each of the ALU and FPU units to operate simultaneously, i.e., in parallel, in executing their operations in response to the same horizontal address. Further, such units can operate in response to addresses recognized by only one of the units when such address lies in the portion of the address space which is dedicated to the location of horizontal microinstructions related only to such one unit.

In a similar manner selected modifier fields supplied as part of the execution control signal may be used to modify either one or both of the horizontal microinstructions supplied by horizontal control stor ROM's 30 and 31. The control of the use of such modifier fields by each horizontal microinstruction is explained in more detail in the above mentioned Carberry et al. patent. The advantage of the configuration of the invention is that the modification process can also be performed in parallel with respect to each horizontal microinstruction when such microinstructions are supplied in parallel by both horizontal control store ROM's 30 and 31 simultaneously.

Thus, in Case #3, for example, of FIG. 3, the bit combinations of the modifier fields supplied by the execution control signal in the example shown are interpreted by the CPU as modifying the SREG field of its microinstruction to provide the SM4B condition shown and are interpreted by the FPU as modifying the MANT and CDST fields of its microinstruction to provide the TM1A and SM2 conditions shown. It is understood that the particular field designations shown in FIG. 3 arbitrarily relate to a specific system and no further explanation of their specific meanings is necessary to an understanding of the invention, since other systems will use different designations therefor in accordance with the particular system in which the invention is used. The important aspect of FIG. 3 is that one or more designated fields of the microinstructions involved provide a bit combination which is interpreted as either requiring or not requiring a μCOMP signal (e.g., the TEST and HSEQ fields in the examples shown) depending on which unit is the last to complete its operation.

What is claimed is:

1. In a data processing system having a source of macroinstructions and a first fixed point arithmetic logic execution means for executing fixed point arithmetic operations and a second floating point arithmetic logic execution means for executing floating point arithmetic operations, said first and second execution means including first and second control store means, respectively, for storing microinstructions and for supplying said microinstructions in response to control store addresses supplied thereto;

said system including common control means responsive to said macroinstructions for providing the same execution control signal to each of said first and second control store means, said control signals comprising at least said control store addresses;

said first control store means responding to first selected ones of said control store addresses to supply microinstructions to said first execution means for execution only by said first execution means;

said second control store means responding to second selected ones of said control store addresses to supply microinstructions to said second execution means for execution only by said second execution means; and said first and second control store means each responding to third selected ones of said control store addresses to simultaneously supply separate microinstructions to said first and said second execution means for execution by their associated first and second execution means, respectively.

2. In a data processing system in accordance with claim 1 wherein each of said first and second execution means includes means for providing an output control signal to said common control means to indicate when said respective execution means has completed the execution of the microinstructions supplied in response to said first and second selected control addresses, respectively.

3. In a data processing system in accordance with claim 2 wherein said first and second execution means further include means for controlling the providing of said output control signal so that an output control signal is supplied only from the execution means which is the last to complete the execution of its microinstruction in response to said third selected control store address.

4. In a data processing system in accordance with claim 3 wherein said control means comprises microsequencing means for providing a sequence of said execution control signals in response to a macroinstruction and further wherein said microsequencing means responds to said output control signal for providing the next execution control signal of said sequence when the execution means which is the last to complete the execution of its microinstruction has completed its execution.

5. In a data processing system in accordance with claim 2 wherein said control means comprises microsequencing means for providing a sequence of said execution control signals in response to a macroinstruction and further wherein said microsequencing means responds to said output control signal for providing the next execution control signal of a sequence thereof when an execution means has completed the execution of its microinstruction.

6. In a data processing system in accordance with claim 1 wherein said first and second control store means are read-only-memory means.

7. In a data processing system in accordance with claim 1 wherein said control means comprises microsequencing means for providing a sequence of said execution control signals in response to a macroinstruction.

8. In a data processing system in accordance with claim 1 wherein said execution control signal further comprises modifier fields and each of said first and second execution means includes first and second modification means, respectively, each responsive to said modifier fields and to microinstructions from said first and second control store means, respectively, for modifying said microinstructions.

9. In a data processing system in accordance with claim 1 wherein said first execution means includes an arithmetic logic unit for performing fixed point arithmetic operations and said second execution means includes a floating point unit for performing floating point arithmetic operations.

10. In a data processing system in accordance with claim 1 wherein the execution control signals supplied by said control means further include modifier information and said first and second execution means includes first and second modifier means, respectively, each responsive to the microinstructions supplied by said first and second control store means, respectively, and further responsive to said modifier information for supplying modified microinstructions for executions by said first and second execution means, respectively.

11. In a data processing system in accordance with claim 10 wherein said first and second modifier means are simultaneously responsive to the modifier information supplied thereto for simultaneously supplying said modified microinstructions.

* * * * *